Aug. 22, 1950   W. L. SITTON   2,519,938
TOOLHOLDER
Filed April 16, 1946

INVENTOR.
William L. Sitton
BY Victor J. Evans & Co.
ATTORNEYS

Patented Aug. 22, 1950

2,519,938

UNITED STATES PATENT OFFICE 2,519,938

TOOLHOLDER

William L. Sitton, Davenport, Iowa

Application April 16, 1946, Serial No. 662,449

1 Claim. (Cl. 29—96)

This invention relates to a new and useful improvements in tool holders adapted especially for lathes, sharpers and similar metal working machines.

Bits, cutters and similar tools are customarily supported by holders. These tool holders are inserted between the jaws of the tool post of the lathe to which they are secured by means of a set screw or the like. As the lathe revolves a work piece the tool bears against the work piece and works it in any manner desired.

Since great force is necessarily involved in working revolving metal, a rigid support for the tool is of great importance. This importance is even greater when hard steels are being worked.

Most tool holders in current use have the disadvantage that they are constructed either for left hand work only, for right hand work only or for straight work only.

The additional tool holders especially designed for reversible right or left hand work have the disadvantage that the tool enters the tool holder at a horizontal angle thus making the distance between the tool holder and the work necessarily greater and materially reducing the rigidity of the tool.

This invention provides a tool holder which may be used alternately for either right hand, left hand or straight work.

The tool holder of this invention has a straight shank portion with a bent shank portion at an angle thereto. As a result, in right and left hand work in which the tool is ordinarily held at an angle to the tool holder, the tool is in this invention held in alignment with the tool holder and the necessary angle is provided by a bend in the tool holder itself which is of stronger and heavier construction than the tool. The tool holder of this invention is therefore more ridged than those in current use.

The invention will be better understood from the following detailed description thereof with reference to the accompanying drawings in which.

Figure 1:
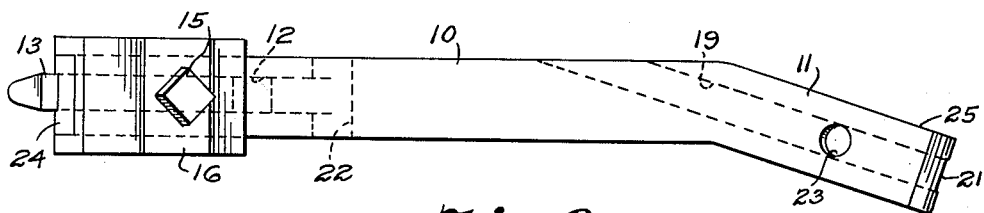
Figure 1 is a top plan view of the tool holder and set screw sleeve with the tool being held in a position for straight work.

The tool holder of this invention has a straight shank portion 10 with a bent shank portion 11 attached at any desired obtuse angle to the straight shank portion 10.

The shank portions 10 and 11 are preferably constructed of heavy cold rolled steel to provide the required strength and rigidity.

A recess 12 is provided in the straight shank portion 10 of a square shape in cross section for the reception in the recess 12 of a tool 13. The recess 12 is preferably sloped upwards toward its outer end to maintain the thrust on the tool 13 from the work piece as directly in alignment with the axis of the tool 13 as possible thereby minimizing the tendency of the tool to shear.

A passageway 14 for the reception of set-screw 15 enters the straight shank portion 10 preferably at a right angle to the tool recess 12.

The passageway 14 may be threaded, if desired, and the tool rigidly clamped by means of a conventional set screw. It is preferred, however, to employ a sleeve 16 having a screw threaded opening 17 in the top thereof since by the use of a sleeve the threads may be made larger and stronger without a weakening of the tool holder. The sleeve 16 extends entirely around the tool holder, although it could be extended only a part way around. In no event, even though the tool holder be round in circumference, should the sleeve extend less than one-half way around the circumference of the tool holder.

The bent shank portion 11 has a right hand channel 18 and a left hand channel 19 extending there through for holding the tool 13 in either a right or a left hand cutting position respectively.

The tool channels 18 and 19 meet at 20 in an acute angle and each channel 18 or 19 is sloped upwards at its outer end 21 at times when the tool is used in right or left hand positions respectively.

Figure 2:
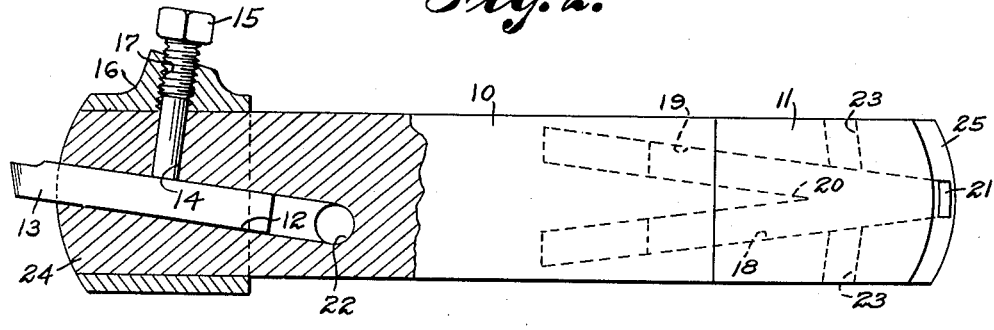
Figure 2 is a side elevation of the tool holder partly in section and showing the manner in which the tool is mounted for straight work as well as the angles of inclination of the channels for the reception of the tool for right and left hand work and also shows the set screw passageways.

The tool channels 18 and 19 as well as the tool recess 12 preferably extend entirely through the tool holder, whenever possible, to allow the use of tools of unlimited lengths. It will be seen, however, by reference to Figure 2 that the usual angles of slope for recess 12 would not allow the extension of recess 12 without a conflict with the inner end 21 of channel 18. For that reason, the recess 12 ends in a hole 22 extending through the sides of the tool holder.

Each tool channel 18 and 19 has a set screw passageway 23 extending thereto and meeting channels 18 and 19 at right angles. As discussed with respect to set screw passageway 14, the passageways 20 may also be threaded but preferably the sleeve 16 is used.

The ends 24 and 25 of the tool holder are rounded to provide clearance for the tool 13 to be set as close as possible to the work piece (not shown).

The operation, should the tool holder be used for straight work the tool 13 is inserted into recess 12 and rigidly secured thereby set screw 15. In all positions the tool holder is held in the jaws of the tool post by its mid-section on the straight shank portion 10.

When it is desired to use the tool holder for right hand work the tool is inserted instead into channel 18 of the bent shank section 11, the sleeve 16 is placed around the bent shank section 11 and the set screw inserted through passageway 23 and tightened. The tool holder is held by the tool post in the position shown in Figure 3 of the drawings for right hand work.

Figure 3:
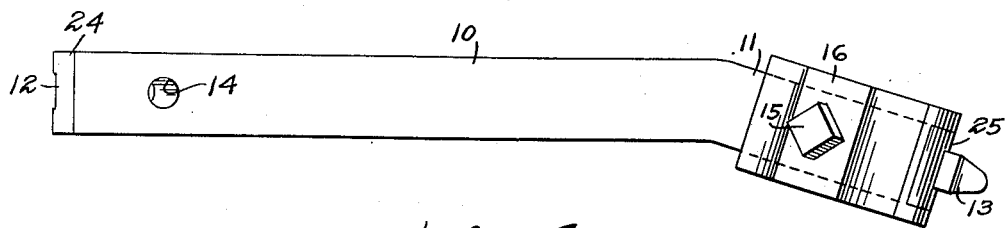
Figure 3 is a top plan view of the tool holder with the tool held in a position for right hand work in a channel of the bent section thereof.
Figure 4:
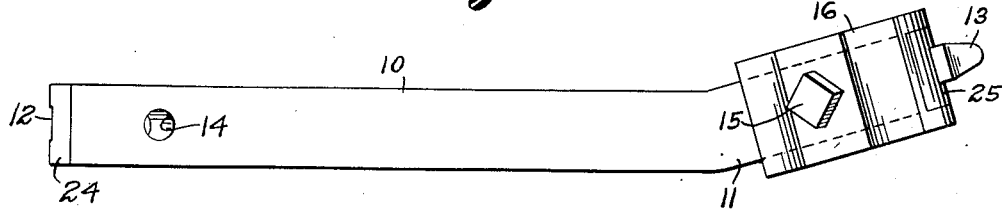
Fig. 4 is another top plan view showing the tool holder and tool in a position for left hand work.

For left hand work the adjustments are substantially the same as for right hand work with the exception that the tool is inserted instead into channel 19 and the tool holder is held by the tool post in the position shown in Figure 3.

The foregoing description of the invention is for illustrative purposes only and it is understood that some modifications may be made in the invention within the scope and spirit of the appended claim.

Having thus fully described my invention, what I claim is:

A tool holder for lathe work, comprising a straight shank portion having a bent shank portion attached at an upwardly inclined angle thereto, said bent shank portion having a channel therein for the reception of a tool and a passageway therein at an angle to said channel for the reception of means for holding said tool firmly in said channel, said bent shank portion also having a second tool channel therein positioned at an angle to said first mentioned tool channel, the forward end of the channels meeting at a common opening at the forward end of the bent portion and the channels inwardly of the common opening extending from each other at an acute angle and the opposite ends of said first and second mentioned channels extending entirely through said bent shank portion for the reception of a tool of unlimited length, said bent shank portion also having a second passageway therein positioned at an angle to said second channel for the reception of means for holding said tool firmly in said second channel said tool holding means including a sleeve which extends around said tool holder and a set screw in said sleeve adapted to engage said tool.

WILLIAM L. SITTON.

REFERENCES CITED

The following references are of record in the file of this patent:

UNITED STATES PATENTS

| Number | Name | Date |
|---|---|---|
| 238,322 | Allen | Mar. 1, 1881 |
| 492,381 | Armstrong | Feb. 28, 1893 |
| 854,669 | Reidy | May 21, 1907 |
| 2,416,774 | Rosenblatt | Mar. 4, 1947 |
| 2,475,784 | Grove | July 12, 1949 |

FOREIGN PATENTS

| Number | Country | Date |
|---|---|---|
| 2,835 | Great Britain | July 12, 1876 |
| 484,843 | France | Nov. 13, 1917 |